United States Patent [19]
Crowe et al.

[11] Patent Number: 4,879,972
[45] Date of Patent: Nov. 14, 1989

[54] DOUBLE PET WALKER

[76] Inventors: Dennis E. Crowe; Julie L. Crowe, both of 5004 SW. 6th, Des Moines, Iowa 50315

[21] Appl. No.: 233,898

[22] Filed: Aug. 15, 1988

Related U.S. Application Data

[63] Continuation of Ser. No. 106,570, Oct. 9, 1987, abandoned.

[51] Int. Cl.⁴ ............................................. A01K 27/00
[52] U.S. Cl. .................................................... 119/109
[58] Field of Search ........................... 119/96, 101, 109

[56] References Cited

U.S. PATENT DOCUMENTS

| | | | |
|---|---|---|---|
| D. 244,869 | 6/1977 | Manley et al. ...................... | D30/153 |
| 2,979,028 | 4/1961 | Zakely .................................... | 119/96 |
| 3,295,501 | 1/1967 | Riley ...................................... | 119/96 |
| 3,563,208 | 2/1971 | Nero ....................................... | 119/96 |
| 3,884,190 | 5/1975 | Gurrey ................................... | 119/109 |
| 4,445,866 | 5/1984 | Cillieres ................................. | 119/96 |
| 4,638,764 | 1/1987 | Anderson .............................. | 119/96 |
| 4,666,017 | 5/1987 | Zimmerman .......................... | 119/96 |

FOREIGN PATENT DOCUMENTS

| | | | |
|---|---|---|---|
| 11996 | 6/1899 | Austria .................................. | 119/96 |
| 638283 | 3/1962 | Canada .................................. | 119/96 |
| 384432 | 11/1923 | Fed. Rep. of Germany ........ | 119/96 |

OTHER PUBLICATIONS

Dunns Since 1950 Magazine—Jun. 1987 Issue, p. 34—Picture of a Chain Coupler and a Nylon Coupler.
Dunns Since 1950 Magazine–Holiday 1987 Issue, p. 34—Copy of a Picture of a Chain Coupler and Nylon Coupler.
Experimental use Affidavit of Dennis E. Crowe, Dated Oct. 7, 1987, with Attached Exhibit A.
Photograph Supporting Dennis E. Crowe Affidavit—Oct. 1987, Photograph of Dennis and Julie Crowe's Double Pet Walker: Sep. 1987, Model on the Left and Oct. 1986, Experimental Model on the Right.

*Primary Examiner*—Robert Peshock
*Attorney, Agent, or Firm*—Henderson & Sturm

[57] ABSTRACT

A double pet walker, for example for dogs, which includes a first flexible line having a first loop in one end thereof for receiving a human hand and a second loop in the other end thereof for receiving a human hand. A combined swivel and snap fastener is attached to the second loop. A second flexible line, shorter than the first, has one end thereof with a third loop thereon large enough to receive a human hand therethrough and this second flexible line has a swivel end snap fastener attached to the other end thereof. A pet collar is attached to the second combination snap and swivel fastener. A third fastener line, also shorter than the first flexible line, has a fourth loop on one end thereof large enough to receive a human hand and the other end thereof has a combination swivel and snap thereon. A pet collar is attached to such third swivel and snap combination.

2 Claims, 4 Drawing Sheets

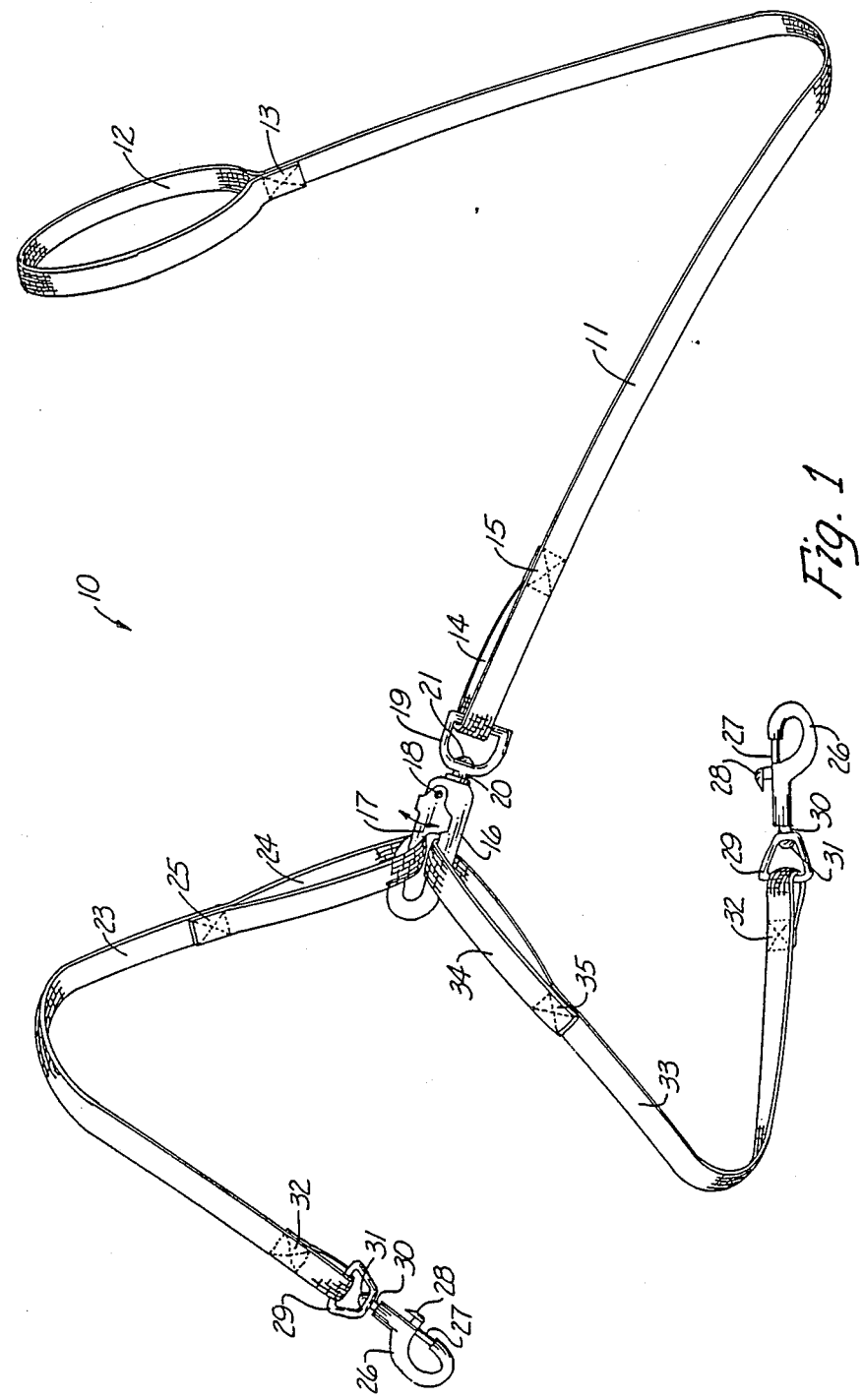

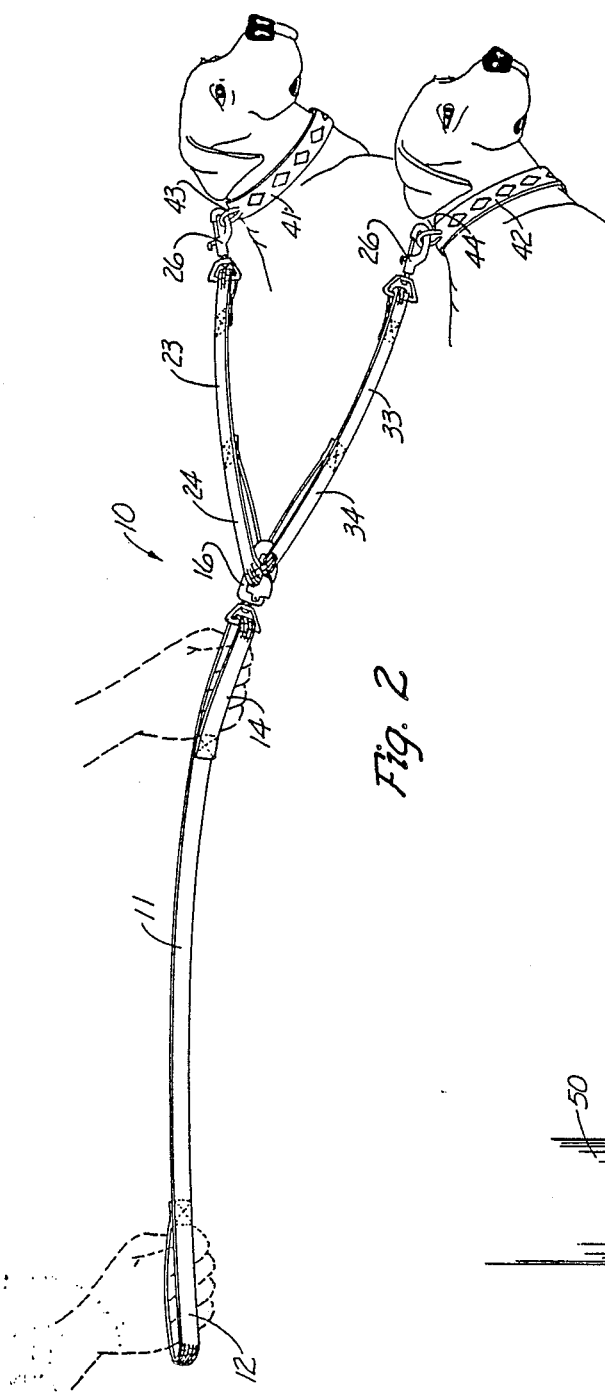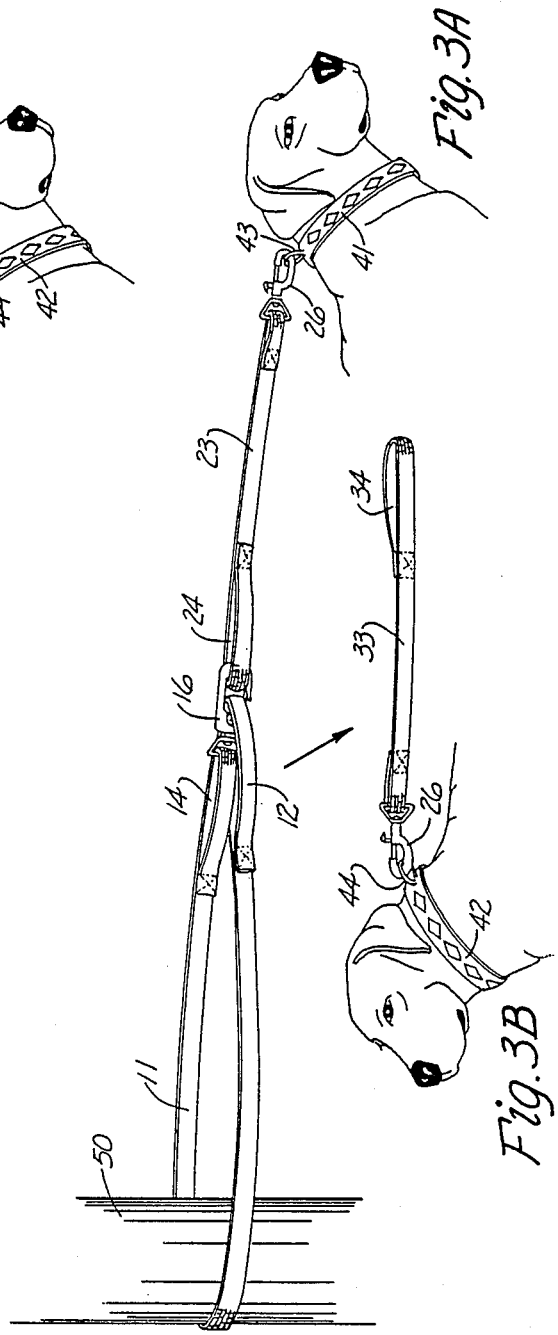

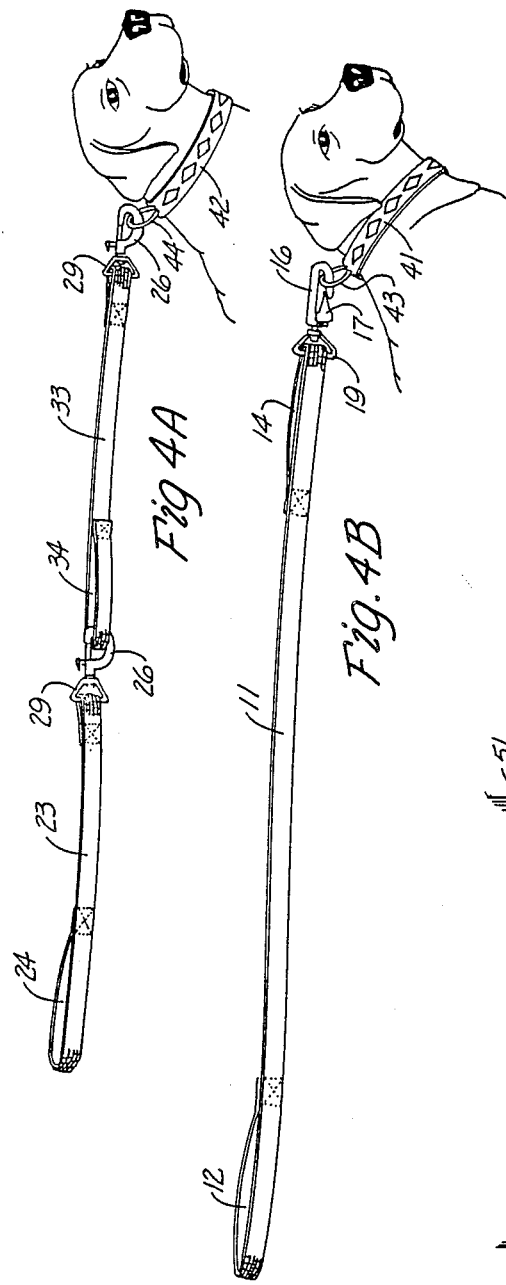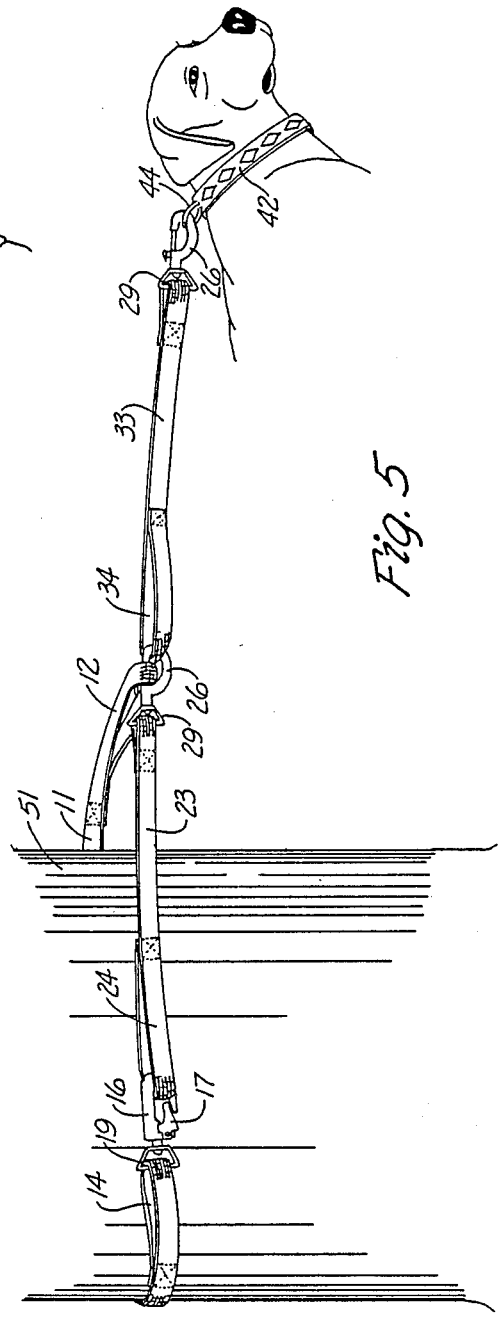

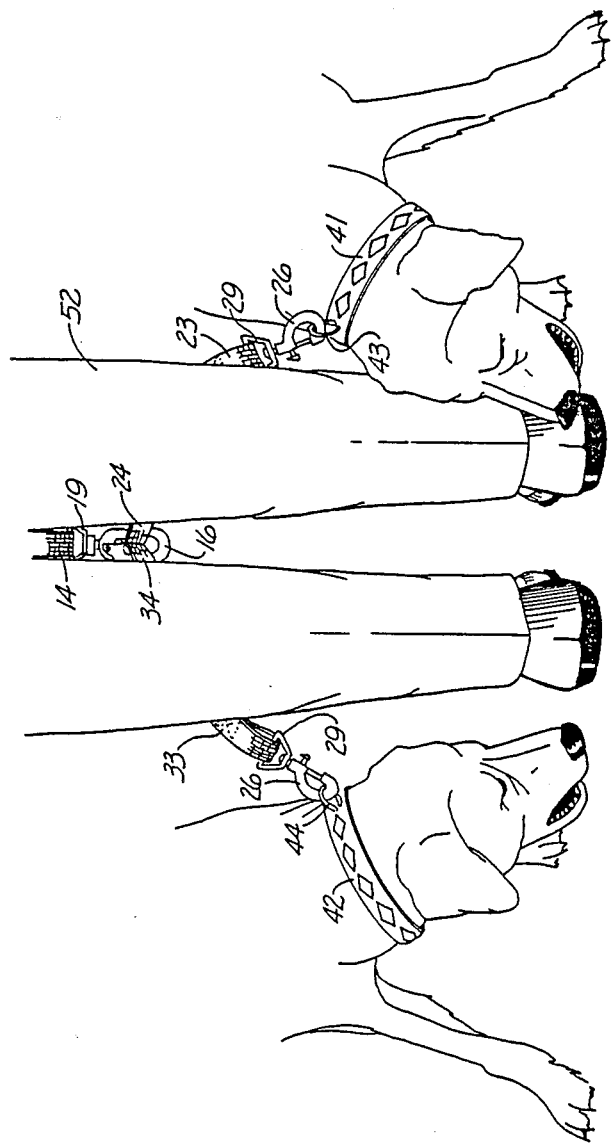

DOUBLE PET WALKER

This is a continuation of co-pending application Ser. No. 106,570 filed on Oct. 9, 1987 and now abandoned.

TECHNICAL FIELD

The present invention relates generally to leashes for walking pets and more particularly to a double pet walker for walking two pets, such as dogs, at the same time without having the leashes tangle.

BACKGROUND ART

Pet owners who have two or more pets, such as dogs, often times have a problem in walking two dogs without the leashes on the dogs becoming tangled. For example, if one dog on the left leash decides to switch to the right side where another dog is on a leash, the leashes will most likely become tangled. Similarly, the leashes can become tangled with the person walking two dogs, for example, if one dog decides to go around the pet owner, thereby entangling the legs of the pet owner as well as the leash of the other dog.

Consequently, there has developed a need for a double pet walker or the like. In recent months, a "lead coupler" has been advertised by Dunns, Inc. of Grand Junction, Tenn. and it includes a ring with two or three short flexible members permanently attached thereto and with a swivel and snap attached to the other end of each flexible member. One problem with such a device is that such structure does not accommodate the pet owner that wants to remove one pet from the other while having access to a short lead thereon. For example, if the two dogs being walked begin to fight, it may be extremely difficult, if not impossible, to separate such fighting dogs without putting the pet owner's hands adjacent the head or neck of one of the dogs to grab the collar thereof, it being common sense of course that that area is a prime target for the other dog and is likely to result in the hand of the owner being bitten.

DISCLOSURE OF THE INVENTION

The present invention relates to a double pet walker, for example for dogs, which includes a first flexible line having a first loop on one end thereof for receiving a human hand and a second loop on the other end thereof for receiving a human hand. A combined swivel and snap fastener is attached to the second loop. A second flexible line, shorter than the first, has one end thereof with a third loop thereon large enough to receive a human hand therethrough and this second flexible line has a swivel and snap fastener attached to the other end thereof. A pet collar is attached to the second combination snap and swivel fastener. A third flexible line, also shorter than the first flexible line, has a fourth loop on one end thereof large enough to receive a human hand and the other end thereof has a combination swivel and snap thereon and a pet collar is attached to such third swivel and snap combination.

An object of the present invention is to provide an improved apparatus for walking more than one pet.

Another object of the present invention is to provide a double dog walker which will at all times remain untangled no matter what the dogs being walked thereon decide to do.

A still further object of the present invention is to provide a double pet walker of the aforementioned type wherein each dog is on a short leash and each short leash is attached to another leash having a short and a longer handle thereon.

A still further object of the present invention is to provide a leash apparatus of the aforementioned type which can readily be converted into two leashes of substantially the same length.

A still further object of the present invention is to provide a leash of the aforementioned type which can be converted into one long leash.

A still further object of the present invention is to provide a double dog walker of the aforementioned type which prevents the dogs from becoming wrapped around the legs of the pet owner.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a double pet walker constructed in accordance with the present invention;

FIG. 2 is a perspective view of the apparatus of FIG. 1 showing two dogs being walked at the same time using the present invention and showing in dashed lines how the pet owner can hold the dogs on a short leash, or alternatively, on a longer leash;

FIGS. 3A and 3B are perspective views of the preferred embodiment of the present invention showing how if the two dogs decide to fight, one dog can be removed on a short leash while the other dog is restrained by a post or tree on the, other part of the leash apparatus;

FIGS. 4A and 4B show one use of the present invention wherein two separate leashes can be formed, for example, in the event that two people are walking the two dogs, rather than the dogs being walked by one person;

FIG. 5 is a perspective view showing the apparatus in use as a very long leash for walking one dog and showing that it is long enough to go around a very large tree in case it is desired to tie the dog up temporarily; and FIG. 6 is a perspective view of the present apparatus in use showing how the short leashes prevent the two dogs from going around in back of the person walking the dog, thereby preventing the dogs from tangling the pet owner under such circumstances.

BEST MODE FOR CARRYING OUT THE INVENTION

Referring now to the drawings wherein like reference numerals designate identical or corresponding parts throughout the several views, FIG. 1 shows a double pet walker (10) constructed in accordance with the present invention. A first flexible strap (11), such as a nylon strap, has a first loop (12) formed on one end thereof by stitching (13). The other end of the strap (11) has a second loop (14) thereon which is formed by stitching (15).

A hook fastener (16) having a lock member (17) pivotally attached thereto by pin (18) and being spring biased by a spring (not shown) to the position shown in FIG. 1 has a swivel structure, including a loop (19), a post (20) upon which the loop (19) may swivel and an enlarged head portion (21) on the post (20) to keep the loop (19) from coming off of the post (20).

A second flexible strap (23) has a loop (24) disposed thereon which is held in place by stitches (25). The other end of the strap (23) has a hook (26) thereon and a spring biased post (27) and handle operating member (28) thereon wherein the post (27) is biased to the position shown in FIG. 1 but can be moved open by pulling on the handle (28) toward a swivel (29) which swivels about a post (30) having a head (31) thereon.

Another flexible strap (33) has a loop (34) formed on one end thereof and is held in place by stitching (35). The other end of the strap (33) has a hook and swivel arrangement (26-31), which is just like the hook and swivel apparatus on the strap (23). A smaller loop, formed by stitching (32), is used to attach the straps (23) and (33) to the swivel and snap structure (26-31). The hook and swivel (26-31) and the hook and swivel (16-21) are commercially available structures and form a part of this invention only in the combination claimed herein and as is shown in the drawings.

In operation, the apparatus (10) shown in FIG. 1 would be attached to the collars (41) and (42) through a ring (41) and (42) by first opening the post (27) on hooks (26) in a conventional fashion and allowing them to move through a spring bias (not shown) into the locking position shown in FIG. 2. Then the dog owner can grasp one or the other of the loops (12) and (14) as shown in dashed lines in FIG. 2, depending upon whether the dog owner wishes to have the dogs on a short leash or on a long leash. By holding the loop (14), the dogs are held closer in an "at heel" position and when this is done, the rest of the strap (11) and loop (12) is preferably wrapped around the wrist to keep the strap (11) out of the way.

Should it happen that the dogs decide to fight while the owner is taking them for a walk, the owner can quickly push on the spring biased member (17) of hook (16), pull the loop (34) out of the hook (16) and insert the loop (12) into the hook (16) and then release the catch (17) so it will again retain the handle loops (12) and (24) as shown in FIG. 3A and showing how the leash (11) has been looped around a post or tree (50) so that the dog on the short leash (33) can be separated from the dog on the leash (24).

Referring to FIG. 4A, it will be noted that if it happens that there are two people walking the dogs, rather than one, then the longer main leash (11) can be utilized for one person to walk one dog and the shorter leashes (23) and (33) can be hooked together and hooked to the dog to be used as a leash for walking the other dog.

If the pet owner wants a still longer leash, for walking only one dog, then all three leashes can be hooked together and this would be especially useful in a case where it is desired to restrain the one dog around a very large tree (51) as shown in FIG. 5 wherein the loop (12) is engaged with the loop (34) into one of the hooks (26). In addition, the loop (24) is hooked into the hook (16) and the loop (34) is also hooked into the hook (26) on strap (23).

If it happens that the two dogs decide to go around in back of the pet owner (52) as shown in FIG. 6, the length of the straps (23) and (33) is chosen to be only about 17" long, compared to 43" long for the strap (11) so that there is simply not enough leash for both dogs to go around the owner (52) and become entangled. Similarly, if the dogs were to try to go around a tree, instead of the owner (52), the lashes would be short enough to prevent tangling of the dogs if they tried to do that.

Accordingly, it will be appreciated that the preferred embodiment disclosed herein does indeed accomplish the aforementioned objects. Obviously, many modifications and variations of the present invention are possible in light of the above teachings. For example, the straps (11), (23) and (33) could be made of rope or many other flexible materials. Similarly, other types of swivels and hook fasteners could be used other than the one shown in the drawings. It is therefore to be understood that, within the scope of the appended claims, the invention may be practiced otherwise than as specifically described.

We claim:

1. A double pet walker consisting of:

a first flexible line, a first loop means for selectively receiving an adult human hand therethrough on one end thereof and a second loop means for selectively receiving an adult human hand therethrough on the other end thereof;

first swivel means attached to said second loop for preventing twisting of said first flexible line;

first snap fastener means attached to said swivel means for selectively receivingly holding flexible members, said snap fastener means including means for selectively opening or closing said snap fastener means;

a second flexible line, one end of said second flexible line having a third loop means thereon large enough to receive an adult human hand therethrough, said second flexible line being substantially shorter than said first flexible line, said first snap fastener means selectively enclosing said third loop means;

second swivel means attached to the other end of said second flexible line for preventing twisting of said second flexible line;

second snap fastener means attached to said second swivel means for selective attachment to pet collars;

a first pet collar attached to said second snap fastener means;

a third flexible line, one end of said third flexible line having a fourth loop means thereon large enough to receive an adult human hand therethrough, said third flexible line being substantially shorter than said first flexible line, said first snap fastener means selectively enclosing said fourth loop means; wherein, the length of said third flexible line and the length of said second flexible line are approximately the same;

third swivel means attached to the other end of said third flexible line for preventing twisting of said third flexible line;

third snap fastener means attached to said third swivel means for selective attachment to a pet collar; and a second pet collar attached to said second snap fastener means whereby two pets can be taken for a walk without tangling of said first, second and third flexible lines.

2. A double pet walker comprising:

a first flexible line, a first loop means for selectively receiving an adult human hand therethrough on one end thereof and a second loop means for selectively receiving an adult human hand therethrough on the other end thereof;

first swivel means attached to said second loop for preventing twisting of said first flexible line;

first snap fastener means attached to said swivel means for selectively receivingly holding flexible members, said snap fastener means including means for selectively opening or closing said snap fastener means;

a second flexible line, one end of said second flexible line having a third loop means thereon large enough to receive an adult human hand therethrough, said second flexible line being substantially shorter than said first flexible line; said first snap fastener means being selectively operatively connected to said third loop means;

second swivel means attached to the other end of said second flexible line for preventing twisting of said second flexible line;

second snap fastener means attached to said second swivel means for selective attachment to pet collars;

a first pet collar attached to said second snap fastener means;

a third flexible line, one end of said third flexible line having a fourth loop means thereon large enough to receive an adult human hand therethrough, said third flexible line being substantially shorter than said first flexible line, said first snap fastener means being selectively operatively connected to said fourth loop means and wherein the length of said third flexible line and the length of said second flexible line are approximately the same;

third swivel means attached to the other end of said third flexible line for preventing twisting of said third flexible line;

third snap fastener means attached to said third swivel means for selective attachment to a pet collar; and a second pet collar attached to said second snap fastener means whereby two pets can be taken for a walk without tangling of said first, second and third flexible lines.

* * * * *